US012772269B2

(12) United States Patent
Wang et al.

(10) Patent No.: US 12,772,269 B2
(45) Date of Patent: Oct. 20, 2026

(54) SIDELINK RESOURCE RECOMMENDATION METHOD AND APPARATUS, DEVICE, AND READABLE STORAGE MEDIUM

(71) Applicant: VIVO MOBILE COMMUNICATION CO., LTD., Dongguan (CN)

(72) Inventors: Huan Wang, Dongguan (CN); Zichao Ji, Dongguan (CN); Shixiao Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 342 days.

(21) Appl. No.: 18/374,638

(22) Filed: Sep. 28, 2023

(65) Prior Publication Data

US 2024/0032078 A1 Jan. 25, 2024

Related U.S. Application Data

(63) Continuation of application No. PCT/CN2022/084510, filed on Mar. 31, 2022.

(30) Foreign Application Priority Data

Apr. 1, 2021 (CN) ......................... 202110358451.2

(51) Int. Cl.
*H04W 72/40* (2023.01)
*H04W 72/04* (2023.01)
(Continued)

(52) U.S. Cl.
CPC ........... *H04W 72/40* (2023.01); *H04W 72/04* (2013.01); *H04W 72/20* (2023.01); *H04W 72/566* (2023.01)

(58) Field of Classification Search
CPC ..... H04W 72/40; H04W 72/04; H04W 72/20; H04W 72/566; H04W 72/51;
(Continued)

(56) References Cited

U.S. PATENT DOCUMENTS

2019/0045526 A1* 2/2019 Lee ........................... H04L 1/18
2019/0082421 A1* 3/2019 Sartori .................. H04W 48/16
(Continued)

FOREIGN PATENT DOCUMENTS

CN 112584480 A 3/2021
CN 114007224 A 2/2022
WO 2022042535 A1 3/2022

OTHER PUBLICATIONS

International Search Report issued in corresponding International Application No. PCT/CN2022/084510, mailed Jun. 28, 2022, 4 pages.

(Continued)

*Primary Examiner* — Atique Ahmed
(74) *Attorney, Agent, or Firm* — IPX PLLC

(57) ABSTRACT

A sidelink resource recommendation method and apparatus, a device, and a readable storage medium, are provided. The method includes: performing, by a first terminal, a first operation, where the first operation includes one or more of the following: sending first information to a second terminal, where the first information is used to trigger the second terminal to recommend a first resource to the first terminal; receiving second information from the second terminal, where the second information includes information about the first resource; and selecting a transmission resource, where the transmission resource includes a first resource or a second resource, the first resource is a resource recommended by the second terminal, and the second resource is a resource autonomously selected by the first terminal.

20 Claims, 2 Drawing Sheets

(51) Int. Cl.
*H04W 72/20* (2023.01)
*H04W 72/566* (2023.01)

(58) Field of Classification Search
CPC ..... H04W 72/54; H04W 72/25; H04W 72/56; H04W 72/044; H04L 5/00; H04L 5/0053; H04L 5/0096
See application file for complete search history.

(56) References Cited

U.S. PATENT DOCUMENTS

| | | | | |
|---|---|---|---|---|
| 2020/0220694 | A1* | 7/2020 | Khoryaev | H04W 28/04 |
| 2020/0383114 | A1* | 12/2020 | Zhang | H04L 5/0053 |
| 2022/0124683 | A1* | 4/2022 | Zhao | H04L 5/0051 |
| 2022/0167311 | A1* | 5/2022 | Xue | H04W 72/02 |
| 2022/0225341 | A1* | 7/2022 | Li | H04W 72/56 |
| 2022/0248374 | A1* | 8/2022 | Uziel | H04W 74/0808 |
| 2022/0322359 | A1* | 10/2022 | Ye | H04W 72/02 |
| 2022/0346118 | A1* | 10/2022 | Wu | H04L 1/1819 |
| 2023/0189294 | A1* | 6/2023 | Dong | H04W 72/20 370/329 |
| 2023/0199726 | A1* | 6/2023 | Fu | H04W 72/04 370/329 |
| 2024/0224237 | A1* | 7/2024 | Ganesan | H04W 24/10 |

OTHER PUBLICATIONS

Convida Wireless, “On Resource Allocation Mode 2 Enhancement for NR Sidelink”, 3GPP TSG-RAN WG2 Meeting #112 electronic R2-20010144, Nov. 2020, 5 pages.
Mediatek Inc., “On sidelink mode-2 resource allocation”, 3GPP TSG RAN WG1 Meeting #99 R1-1912106, Nov. 2019, 13 pages.

* cited by examiner

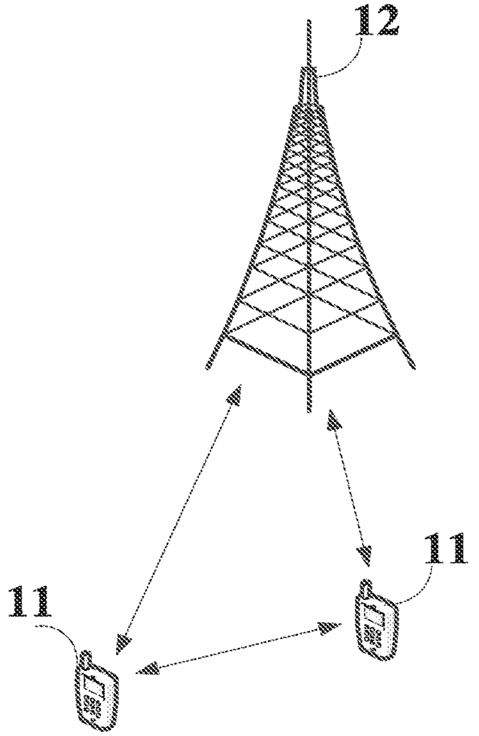

FIG. 1

A first terminal performs a first operation, where the first operation includes one or more of the following:
sending first information to a second terminal, where the first information is used to trigger the second terminal to recommend a first resource to the first terminal;
receiving second information from the second terminal, where the second information includes information about the first resource; or
selecting a transmission resource, where the transmission resource includes a first resource and/or a second resource, the first resource is a resource recommended by the second terminal, and the second resource is a resource autonomously selected by the first terminal.

201

FIG. 2

SIDELINK RESOURCE RECOMMENDATION METHOD AND APPARATUS, DEVICE, AND READABLE STORAGE MEDIUM

CROSS-REFERENCE TO RELATED APPLICATIONS

This application is a continuation of International Application No. PCT/CN2022/084510, filed on Mar. 31, 2022, which claims priority to Chinese Patent Application No. 202110358451.2, filed Apr. 1, 2021. The entire contents of each of the above-identified applications are expressly incorporated herein by reference.

TECHNICAL FIELD

The present disclosure pertains to the field of communications technologies, and in particular, to a sidelink resource recommendation method and apparatus, a device, and a readable storage medium.

BACKGROUND

There are two resource allocation modes in the New Radio (NR) SideLink (SL), one is a resource allocation mode based on base station scheduling (mode 1), and the other is a resource allocation mode based on autonomous resource selection of a terminal (such as User Equipment (UE)) (mode 2). With regard to the resource allocation mode based on base station scheduling, a sidelink resource used by the UE for data transmission is determined by the base station, and receive (RX) UE is notified through downlink signaling, with regard to the resource allocation mode based on autonomous resource selection of UE, the UE selects an available transmission resource from a (pre-)configured pool, and before resource selection, the UE performs channel sensing, selects a resource set with less interference based on a channel sensing result, and then randomly selects a resource for transmission from the resource set.

Because in the related resource selection method, only the autonomous resource selection of the UE is considered, reliability and timeliness of transmission are affected.

SUMMARY

Embodiments of the present disclosure provide a sidelink resource recommendation method and apparatus, a device, and a readable storage medium.

According to a first aspect, a sidelink resource recommendation method is provided, including:

performing, by a first terminal, a first operation, where the first operation includes one or more of the following:

sending first information to a second terminal, where the first information is used to trigger the second terminal to recommend a first resource to the first terminal;

receiving second information from the second terminal, where the second information includes information about the first resource; and selecting a transmission resource, where the transmission resource includes a first resource and/or a second resource, the first resource is a resource recommended by the second terminal, and the second resource is a resource autonomously selected by the first terminal.

According to a second aspect, a sidelink resource recommendation apparatus is provided, applied to a first terminal, and including:

an execution module, configured to perform a first operation, where the first operation includes one or more of the following:

sending first information to a second terminal, where the first information is used to trigger the second terminal to recommend a first resource to the first terminal;

receiving second information from the second terminal, where the second information includes information about the first resource; and selecting a transmission resource, where the transmission resource includes a first resource and/or a second resource, the first resource is a resource recommended by the second terminal, and the second resource is a resource autonomously selected by the first terminal.

According to a third aspect, a terminal is provided, where the terminal includes a processor, a memory, and a program stored in the memory and executable on the processor, and when the program is executed by the processor, steps of the method according to the first aspect are implemented.

According to a fourth aspect, a terminal is provided, including a processor and a communications interface. The processor is configured to implement steps of the method according to the first aspect when executing.

According to a fifth aspect, a readable storage medium is provided, where the readable storage medium stores a program or an instruction, and when the program or the instruction is executed by a processor, steps of the method according to the first aspect are implemented.

According to a sixth aspect, a computer program/program product is provided, where the computer program/program product is stored in a storage medium, and the computer program/program product is executed by at least one processor to implement steps of the processing method according to the first aspect.

According to a seventh aspect, a chip is provided. The chip includes a processor and a communications interface, the communications interface is coupled to the processor, and the processor is configured to run a program or an instruction to implement the processing method according to the first aspect.

According to an eighth aspect, a communications device is provided, and is configured to perform the processing method according to the first aspect.

BRIEF DESCRIPTION OF DRAWINGS

FIG. 1 is a block diagram of a wireless communications system according to an embodiment of the present disclosure;

FIG. 2 is a flowchart of a sidelink resource recommendation method according to an embodiment of the present disclosure;

DETAILED DESCRIPTION

Figure 3:
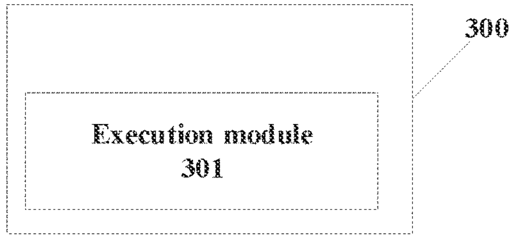
FIG. 3 is a block diagram of a sidelink resource recommendation apparatus according to an embodiment of the present disclosure.

For ease of understanding the implementations of the present disclosure, the following are described first.

1. Introduction to the New Radio (NR) SideLink (SL) Resource Allocation/Selection.

There are two NR SL resource allocation modes, one is based on base station scheduling (mode 1), one is a resource allocation mode based on base station scheduling (mode 1), and the other is a resource allocation mode based on autonomous resource selection of a terminal (such as User Equipment (UE)) (mode 2).

A specific working procedure in the mode 2 is as follows.

1) After resource selection is triggered, RX UE first determines a resource selection window, where a lower boundary of the resource selection window is in a T1 time after the resource selection is triggered, and an upper boundary of the resource selection is in a T2 time after the triggering. T1 is selected within a range of [T1_min, T1_max] in a manner implemented by the UE, T2 is a value selected within a Packet Delay Budget (PDB) transmitted by a Transport Block (TB) in a manner implemented by the UE, and T2 is not earlier than T1.

The PDB transmitted in this specification can also be referred to as a remaining PDB.

2) Before resource selection, the UE needs to determine a candidate resource set for resource selection, a number of candidate resources (such as sub-channels) is determined by a Media Access Control (MAC) layer. The UE compares a Reference Signal Receiving Power (RSRP) measurement value (for example, estimation by sensing a Physical Sidelink Control CHannel (PSCCH)/Physical Sidelink Shared CHannel (PSSCH)) estimated on a resource in a resource selection window with a corresponding RSRP threshold. If the RSRP is higher than the RSRP threshold, the resource is excluded and cannot be included in the candidate resource set. After resource exclusion, remaining resources in the resource selection window form the candidate resource set. Resources in the candidate resource set account for at least x % of resources in the resource selection window. If the resources in the candidate resource set account for less than x % of the resources in the resource selection window, the RSRP threshold needs to be increased based on a step-by-step value (3 dB), and then the resource exclusion is performed until no less than x % of the resources can be selected. In addition, the RSRP comparison is related to a priority of a TB to be transmitted and a priority value of demodulation on the PSCCH, and a specific process is not repeated herein.

3) After the candidate resource set is determined, the UE randomly selects a transmission resource in the candidate resource set, and a number of selected resources is determined based on a decision of the MAC layer.

Step 1) and step 2) are performed at the physical layer, and step 3) is performed at a higher layer (the MAC layer). In addition, the UE can reserve a transmission resource for a next transmission in this transmission.

2. Introduction to Sidelink Resource Reservation/Indication.

In the NR SL, TX UE may perform resource reservation/indication on allocated resources (the reservation includes periodic reservation and aperiodic reservation), and reserved resources may be used for future PSCCH/PSSCH transmission.

The aperiodic reservation may be implemented by using a time domain resource assignment field in Sidelink Control Information (SCI) (indicating resources in at least 1 to 32 slots), and reserved resources may be used for transmission of at least a same TB.

The periodic reservation/indication may be implemented by using a resource reservation period field in the SCI, and periodic resources reserved in a current period may be used for transmission of a next TB. A frequency domain resource appears periodically herein, and can be referred to as a periodic resource of the resource.

3. Introduction to SL Resource Pre-Emption.

In the resource allocation mode of Mode 2, a resource pre-emption mechanism is supported, and brief descriptions of the mechanism are as follows. A resource reserved/selected by UE overlaps (partially overlaps) with a resource reserved/selected by another UE with a higher priority service. If an SL-RSRP measurement value of the UE on an associated resource is greater than an associated SL-RSRP threshold, the UE may trigger resource reselection. The service priority and the SL-RSRP threshold are determined by TB transmission on the resource.

4. Introduction to SL Resource Re-Evaluation.

In the resource allocation mode of Mode 2, a resource re-evaluation mechanism is supported, and brief descriptions of the mechanism are as follows. At least for resources that the UE has selected but not reserved (other forms of resources are not excluded, but are not described herein because of space limitation), if the resource overlaps (partially overlaps) with a resource reserved/selected by another UE, and if a measurement value of SL-RSRP of the UE on an associated resource is greater than a specific associated SL-RSRP threshold, the UE may trigger re-selection for the resource.

5. Introduction to SL Hybrid Automatic Repeat reQuest (HARQ) Round-Trip Time (RTT) limitation.

At least for the mode 2, to ensure that a resource used for PSSCH retransmission appears after the TX UE demodulates feedback information, it is specified that a time interval between PSSCH transmission resources selected in any two times needs to be greater than the HARQ RTT, to ensure transmission efficiency and reliability.

6. Introduction to an Enhanced Scheme of NR Sidelink Resource Allocation/Selection.

A terminal A (UE-A) decides a resource set, the UE-A informs a terminal B (UE-B) of the resource set, and the UE-B can consider the resource set informed by the UE-A when selecting resources in the mode 2.

7. Introduction to an UpLink (UL)/SL Prioritization Determination Flow Scheme.

SL sending/reception may conflict with UL sending. In some application scenarios, if there is a conflict, a low-priority party (SL/UL) needs to drop/reduce the power. In order to determine a priority between SL sending/reception and UL transmission, a prioritization determination rule is defined in the standard, and a final priority between SL sending/reception and UL sending is determined based on an SL priority index and/or a UL priority index.

For an enhancement scheme of SL resource selection, for example, it can be considered that the RX UE recommends a resource to transmit (TX) UE, and the TX UE uses the recommended resource for transmission; or Coordination UE (Co-UE) recommends a resource to the TX UE, and the TX UE uses the recommended resource for transmission. The Co-UE can also be used as the RX UE, or the RX UE can be used as the Co-UE.

In order to ensure reliability and effectiveness of transmission, a transmission parameter and other demand elements of another UE (the another UE may be target UE of resource recommendation) need to be considered, while in the associated resource selection method, only transmission demands in this UE side are considered.

In addition, the recommended resource still needs to be notified by using an additional transmission resource, and the resource can be independent of the transmission resource of the TB, while in the associated resource selection method, only selection for the transmission resource of the TB is considered.

The embodiments of the present disclosure are described below with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In the specification and claims of the present disclosure, the terms "first," "second," and the like are intended to distinguish between similar objects but do not describe a specific order or sequence. It should be understood that, the terms used in such a way are interchangeable in proper circumstances, so that the embodiments of the present disclosure can be implemented in an order other than the order illustrated or described herein. Objects classified by "first" and "second" are usually of a same type, and the number of objects is not limited. For example, there may be one or more first objects. In addition, "and" in the specification and claims represents at least one of connected objects, and a character "/" generally represents an "or" relationship between associated objects.

It should be noted that, the technologies described in the embodiments of the present disclosure are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of the present disclosure may be used interchangeably. The described technologies can be applied to both the systems and the radio technologies mentioned above as well as to other systems and radio technologies. A New Radio (NR) system is described below for an illustration purpose, and NR terms are used in most of the following descriptions, but these technologies can also be applied to an application other than an NR system application, for example, a $6^{th}$ Generation (6G) communications system.

FIG. 1 is a block diagram of a wireless communications system to which the embodiments of the present disclosure may be applied. The wireless communications system includes a terminal 11 and a network side device 12. The terminal 11 may also be referred to as a terminal device or User Equipment (UE). The terminal 11 may be a terminal side device such as a mobile phone, a tablet computer, a laptop computer or a notebook computer, a Personal Digital Assistant (PDA), a palmtop computer, a netbook, an Ultra-Mobile Personal Computer (UMPC), a Mobile Internet Device (MID), a wearable device, Vehicle User Equipment (VUE), or Pedestrian User Equipment (PUE). The wearable device includes a smartwatch, a bracelet, a headset, glasses, and the like. It should be noted that a specific type of the terminal 11 is not limited in this embodiment of the present disclosure.

The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a WiFi node, a Transmitting Receiving Point (TRP), a wireless access network node, or another appropriate term in the art. As long as the same technical effect is achieved, the base station is not limited to a specific technical term. It should be noted that, in this embodiment of the present disclosure, only a base station in an NR system is used as an example, but a specific type of the base station is not limited.

A sidelink resource recommendation method and apparatus, a device, and a readable storage medium provided in the embodiments of the present disclosure are described below in detail through some embodiments and application scenarios thereof with reference to the accompanying drawings.

Refer to FIG. 2, the present disclosure provides a sidelink resource recommendation method. The method may be performed by a first terminal and specifically includes step 201.

Step 201: The first terminal performs a first operation, where the first operation includes one or more of the following items.

(1) Send first information to a second terminal, where the first information is used to trigger the second terminal to recommend a first resource to the first terminal.

The first terminal may also be referred to as TX UE, and the second terminal may be referred to as Co-UE.

The first information may also be referred to as trigger signaling. In some implementations, the first information may be in a form of Sidelink Control Information (SCI), a Medium Access Control Element (MAC CE), Radio Resource Control (RRC) signaling, or the like.

The first resource may also be referred to as a recommended resource.

(2) Receive second information from the second terminal, where the second information includes information about the first resource.

The second information may also be referred to as resource recommendation signaling.

(3) Select a transmission resource, where the transmission resource includes a first resource and/or a second resource, the first resource is a resource recommended by the second terminal, and the second resource is a resource autonomously selected by the first terminal.

The second resources may also be referred to as an autonomously selected resource.

In an implementation of the present disclosure, the first information is information carried on a first channel, and the first channel includes a Physical Sidelink Control CHannel (PSCCH) or a Physical Sidelink Shared CHannel (PSSCH). To be specific, the first information is carried by using the PSCCH or the PSSCH.

In an implementation of the present disclosure, a Packet Delay Budget (PDB), a number of sub-channels, or a number of retransmissions of the first information is specified by a protocol, configured by a control node, dynamically indicated by the control node, pre-configured by the control node, negotiated between terminals (for example, between TX UE and Co-UE), or determined by the first terminal autonomously.

The control node may include: a network side device, a base station, a head node, UE, RX UE, or relay UE.

In an implementation of the present disclosure, a PDB of the first information is related to a PDB of a first Transport Block (TB) to be transmitted. For example, it is specified in a protocol or configured by the control node that a PDB value (or range) of each first TB to be transmitted is corresponding to a PDB of one piece of first information.

In an implementation of the present disclosure, a priority of the first information is specified in a protocol, configured by the control node, dynamically indicated by the control node, pre-configured by the control node, or negotiated between terminals (for example, between TX UE and Co-UE); or the priority of the first information is equal to the priority of the first TB to be transmitted.

For example, the first information is carried by a MAC CE, and the priority of the MAC CE may be configured or pre-configured by the control node.

In some implementations, if information carried on the PSCCH or the PSSCH is multiplexed by the first information with other information, the priority of the PSCCH or the PSSCH is one of the following:

(1) a highest value among priorities of all information;

(2) a priority of the first information; and (3) being determined based on a priority of other information other than the first information.

In an implementation of the present disclosure, a priority of the first channel is a highest value among priorities of all pieces of information carried on the first channel.

In an implementation of the present disclosure, the priority of the first channel is the priority of the first information.

In an implementation of the present disclosure, the priority of the first channel is determined based on a priority of third information, where the third information includes other information carried on the first channel other than the first information.

In an implementation of the present disclosure, the first information is information carried on a second channel, and the second channel includes a Physical Sidelink Feedback CHannel (PSFCH) or a channel other than the PSCCH, the PSSCH, or the PSFCH, namely, a newly defined channel (for example, PSxCH), where the priority of the first information is specified in a protocol, configured by the control node, dynamically indicated by the control node, pre-configured by the control node, or negotiated between terminals (for example, between TX UE and Co-UE); or the priority of the first information is equal to the priority of the first TB to be transmitted.

In an implementation of the present disclosure, a step of sending, by the first terminal, first information to a second terminal includes: sending, by the first terminal, the first information to the second terminal by using a third resource.

The third resource may also be referred to as bearer resource of a trigger signaling.

The following describes a selection process of triggering the third resource and the transmission resource.

In an implementation of the present disclosure, the method further includes one of the following items.

(1) The first terminal triggers selection for the third resource and selection for the transmission resource separately.

For example, the selection for the third resource is triggered first, and then the selection for the transmission resource is triggered.

(2) The first terminal triggers selection for the third resource and selection for the transmission resource simultaneously.

(3) The first terminal triggers selection for the transmission resource, where the third resource is at least part of the transmission resource.

To be specific, only the selection for the transmission resource is triggered, and after the selection for the transmission resource is triggered, the UE may select a resource to send the first information.

In an implementation of the present disclosure, a step of triggering, by the first terminal, selection for the third resource includes:

when a condition in which the first terminal selects or reselects a first TB to be transmitted is met, triggering, by the first terminal, the selection for the third resource. In some implementations, the first terminal autonomously decides whether to trigger the selection for the third resource.

In some implementations, the priority of the first information may further be used in an SL prioritization procedure of the SL transmission and other transmission.

The SL prioritization procedure includes: sending and receiving the first information, and/or sending and receiving feedback signaling corresponding to the first information.

It should be noted that the receiving and sending of the second information can be performed in different priority determining manners.

In some implementations, the priority of the first information is further used for priority determination between sending or receiving the first information and another transmission; and the another transmission include at least one of NR SL sending, NR SL reception, NR UL sending, Evolved Universal Terrestrial Radio Access (EUTRA) SL sending, and EUTRA SL reception.

In an implementation of the present disclosure, the method further includes:

transmitting, by the first terminal, a first TB to be transmitted in a target resource selection mode, where the target resource selection mode is one or more of first resource selection modes;

or transmitting, by the first terminal, a first TB to be transmitted through a target resource, where the target resource is one or more of the transmission resources, where the first resource selection mode includes one or more of the following: a resource recommendation mode and an autonomous resource selection mode, the resource recommendation mode is used for the first terminal to obtain the first resource, and the autonomous resource selection mode is used for the first terminal to autonomously select the second resource.

In an implementation of the present disclosure, the target resource selection mode or the target resource is specified by a protocol, configured by a control node, dynamically indicated by the control node, pre-configured by the control node, or negotiated between terminals (for example, between TX UE and Co-UE).

In an implementation of the present disclosure, the target resource selection mode or the target resource is configured by the control node based on per pool; or the target resource selection mode or the target resource is dynamically indicated by the control node based on per UE.

In an implementation of the present disclosure, the method further includes one or more of the following items.

(1) The first terminal determines the target resource selection mode or the target resource based on a capability or a state of the first terminal.

For example, if the TX UE does not support a capability of carrier sensing/is in a power saving state, the TX UE may disable the autonomous resource selection mode.

(2) The first terminal determines the target resource selection mode or the target resource based on a Channel Busy Rate (CBR) or a Channel Occupation Rate (CR).

For example, if the CBR or the CR is greater than or equal to a preset value, the TX UE uses the autonomous resource selection mode (or uses the autonomously selected resource).

(3) The first terminal determines the target resource selection mode or the target resource based on a PDB (for example, a remaining PDB) or a priority of the first TB to be transmitted.

For example, if the remaining PDB or the priority is less than or equal to a preset value, the TX UE uses the autonomous resource selection mode (or uses the autonomously selected resource).

In an implementation of the present disclosure, the method further includes:

determining, by the first terminal based on a CBR or a CR, that the first resource is a resource expected to be used by the first terminal, or determines that the first resource is a resource not expected to be used by the first terminal.

In an implementation of the present disclosure, the target resource selection mode or the target resource is dynamically selected by the first terminal, that is, the first terminal uses the autonomous resource selection mode or uses the autonomously selected resource.

In an implementation of the present disclosure, when the selection for the transmission resource and the selection for the third resource are independently triggered, (1) the selection for the transmission resource is triggered autonomously based on the first terminal, or triggered based on a trigger condition of autonomous resource selection in a mode 2 (for example, a mode 2 in Rel-16);

or (2) a time interval between a trigger time for the selection for the transmission resource and a trigger time for the selection for the third resource (for example, a minimum trigger time or a maximum trigger time) is specified by a protocol, configured by a control node, pre-configured by the control node, negotiated between terminals, or determined by using a preset rule; or (3) trigger of the selection for the transmission resource is related to the first information and/or the second information.

In an implementation of the present disclosure, the time interval is determined based on a PDB (for example, a remaining PDB) of a first TB to be transmitted.

In an implementation of the present disclosure, that trigger of the selection for the transmission resource is related to the first information and/or the second information includes one or more of the following items.

(1) After the selection for the third resource is triggered, if the first terminal does not send or fails to send the first information within a preset time, the first terminal triggers the selection for the transmission resource.

(2) After the selection for the third resource is triggered, if the first terminal fails to receive or fails to demodulate the second information within a preset time, the first terminal triggers the selection for the transmission resource.

(3) After the first information is sent, if the first terminal fails to receive or fails to demodulate the second information within a preset time, the first terminal triggers the selection for the transmission resource.

In some implementations, the preset time is related to the PDB of the first TB to be transmitted (such as the remaining PDB).

In some implementations, a preset time is specified in a protocol, configured, dynamically indicated, or pre-configured by the control node, or negotiated between terminals (for example, between TX UE and Co-UE).

(4) When the second information is received or successfully received, the first terminal triggers the selection for the transmission resource.

(5) When the first information is sent or successfully sent, the first terminal triggers the selection for the transmission resource.

In an implementation of the present disclosure, when the selection for the transmission resource and the selection for the third resource are triggered simultaneously (or triggered uniformly) (in this case, only the transmission resource needs to be triggered), a location of the transmission resource is determined according to a preset rule.

For example, the transmission resource of the TB is located after X time units of the resource selection trigger, or after Y time units of a selected first information bearer resource, and X and Y are greater than or equal to 0.

In an implementation of the present disclosure, a selection criterion for the target resource selection mode or the target resource includes one or more of the following:

(1) the autonomous resource selection mode is preferentially used as the target resource selection mode, or the second resource is preferentially used as the target resource;

(2) the resource recommendation mode is preferentially used as the target resource selection mode, or the first resource is preferentially used as the target resource; and (3) the target resource selection mode is one or more of the first resource selection modes autonomously selected by the first terminal, or the target resource is part or all of one or more types of the transmission resource autonomously selected by the first terminal.

In an implementation of the present disclosure, a selection criterion for the autonomous resource selection mode or the second resource includes one or more of the following:

(1) when the first terminal does not obtain the first resource within a preset time, using, by the first terminal, the autonomous resource selection mode or the second resource (that is, the first terminal uses an autonomously selected resource); and (2) when the first resource is used up, or after one or more time units after the first resource is used up, using, by the first terminal, the autonomous resource selection mode or the second resource.

For example, in one or more time units after the recommended resource is used up (in some implementations, if no new recommended resource is obtained), the TX UE uses (/the UE decides whether to use) the autonomous resource selection mode (/uses the autonomously selected resource).

In an implementation of the present disclosure, a situation in which the first terminal does not obtain the first resource within a preset time includes one or more of the following items.

(1) After the selection for the third resource is triggered, the first terminal does not send or fails to send the first information within a preset time.

To be specific, after the selection for the first information (trigger signaling) bearer resource is triggered, the UE does not send or fails to send the first information within the preset time.

(2) After the selection for the third resource is triggered, or the first information is sent, the first terminal fails to receive or fails to demodulate the second information within a preset time.

To be specific, after the selection for the first information bearer resource is triggered or the first information is sent, the UE fails to receive/fails to demodulate the second information (resource recommendation signaling) within a preset time.

(3) After the selection for the transmission resource is triggered, the first terminal fails to receive/fails to demodulate the second information within a preset time, or the first terminal does not send or fails to send the first information.

To be specific, after the resource selection is triggered, the UE fails to receive/fails to demodulate the second information (resource recommendation signaling) or does not send (fails to send) the first information (trigger signaling) within a preset time.

(4) Before the first terminal autonomously selects a first resource, the first terminal fails to receive or fails to demodulate the second information.

In an implementation of the present disclosure, the preset time is related to a PDB of a first TB to be transmitted (or a remaining PDB); or the preset time is specified by a protocol, configured by a control node, dynamically indicated by the control node, pre-configured by the control node, or negotiated between terminals (for example, between TX UE and Co-UE).

In an implementation of the present disclosure, the first resource selection mode includes a resource recommendation mode and an autonomous resource selection mode, and the first terminal preferentially uses a recommended resource selection mode;

or the transmission resource includes all or part of the first resource and the second resource, and the first terminal preferentially uses the first resource.

The meaning of the preferentially use can be that the recommended resource is used if there is a resource recommended, and the autonomously selected resource is used after the recommended resource is used up.

For example, when the first resource (the recommended resource) is available to the TX UE within a time limit, the TX UE (preferentially) uses the recommended resource.

For example, the TX UE does not obtain the first resource (the recommended resource) within a time limit, but obtains the first resource (the recommended resource) before completing TB transmission, and the TX UE (preferentially) uses the first resource (the recommended resource) to continue the TB transmission.

In an implementation of the present disclosure, if the first terminal selects a resource recommendation mode or an autonomous resource selection mode, the first terminal keeps using the resource recommendation mode or the autonomous resource selection mode:

and/or if the first terminal selects a resource recommendation mode or an autonomous resource selection mode, the first terminal keeps transmitting a second TB by using a resource selected in the autonomous resource selection mode or the resource recommendation mode.

For example, for transmission of one TB, if only a resource selected in one mode is allowed to be used, once the mode is determined, the UE cannot change the mode; and/or, a resource selected in another mode can be used for transmission of another TB (for example, TB transmission to same RX UE/destination ID).

In an implementation of the present disclosure, when the target resource is part or all of one or more types of the transmission resource autonomously selected by the first terminal, the target resource meets one or more of the following:

(1) a number of the target resources is less than or equal to one or more of maximum transmission times of the first TB to be transmitted, a number of the first resources, and a number of the second resources;

(2) the first terminal cannot discard a reserved resource; and (3) the target resource meets a preset restriction condition, where the preset restriction condition includes one or more of the following:

(a) for a TB to be transmitted that is fed back by an HARQ or for a pool configured with a PSFCH, a distance between any two target resources meets an HARQ RTT requirement; and (b) a time interval between any two target resources is less than a preset value.

In an implementation of the present disclosure, the preset restriction condition is not applicable to at least one of the following cases:

(1) between the first resource and the second resource;

(2) between the first resources;

(3) between a $1^{st}$ first resource indicated by the first information and a second resource before the $1^{st}$ first resource; and (4) between a last first resource indicated by the first information and a second resource after the last first resource.

In an implementation of the present disclosure, the method further includes:

reselecting, by the first terminal, the second resource based on the preset restriction condition. For example, the TX UE reselects an autonomously selected resource thereof to meet the preset restriction.

In an implementation of the present disclosure, the method further includes:

performing, by the first terminal, re-evaluation or pre-emption detection on the first resource.

In an implementation of the present disclosure, the re-evaluation or pre-emption detection is specified by a protocol, configured by a control node, dynamically indicated by the control node, pre-configured by the control node, or negotiated between terminals (for example, between TX UE and Co-UE).

In an implementation of the present disclosure, the method further includes:

after the performing, by the first terminal, re-evaluation or pre-emption detection on the first resource, performing, by the first terminal, one or more of the following:

(1) discarding an interference resource;

(2) reselecting the first resource; and (3) selecting the second resource.

In the embodiments of the present disclosure, timeliness of resource recommendation is improved through the first information and/or the second information, and the recommended resource and the autonomously selected resource can be combined to improve reliability, timeliness, and efficiency of transmission.

Referring to FIG. 3, the present disclosure provides a sidelink resource recommendation apparatus. The apparatus is applied to a first terminal, and the apparatus 300 includes an execution module 301.

The execution module 301 is configured to perform a first operation, where the first operation includes one or more of the following:

(1) sending first information to a second terminal, where the first information is used to trigger the second terminal to recommend a first resource to the first terminal;

(2) receiving second information from the second terminal, where the second information includes information about the first resource; and (3) selecting a transmission resource, where the transmission resource includes a first resource and/or a second resource, the first resource is a resource recommended by the second terminal, and the second resource is a resource autonomously selected by the first terminal.

The second resources may also be referred to as an autonomously selected resource.

In an implementation of the present disclosure, the first information is information carried on a first channel, and the first channel includes a PSCCH or a PSSCH. In an implementation of the present disclosure, a PDB, a number of sub-channels, or a number of retransmissions of the first information is specified by a protocol, configured by a control node, dynamically indicated by the control node, pre-configured by the control node, negotiated between terminals (for example, between TX UE and Co-UE), or determined by the first terminal autonomously.

In an implementation of the present disclosure, a PDB of the first information is related to a PDB of a first TB to be transmitted. For example, it is specified in a protocol or configured by the control node that a PDB value (or range) of each first TB to be transmitted is corresponding to a PDB of one piece of first information.

In an implementation of the present disclosure, a priority of the first information is specified in a protocol, configured by the control node, dynamically indicated by the control node, pre-configured by the control node, or negotiated between terminals (for example, between TX UE and Co-UE); or the priority of the first information is equal to the priority of the first TB to be transmitted.

In an implementation of the present disclosure, a priority of the first channel is a highest value among priorities of all pieces of information carried on the first channel.

In an implementation of the present disclosure, the priority of the first channel is the priority of the first information.

In an implementation of the present disclosure, the priority of the first channel is determined based on a priority of third information, where the third information includes other information carried on the first channel other than the first information.

In an implementation of the present disclosure, the first information is information carried on a second channel, and the second channel includes a PSFCH or a channel other than the PSCCH, the PSSCH, or the PSFCH.

The priority of the first information is specified in a protocol, configured by the control node, dynamically indicated by the control node, pre-configured by the control node, or negotiated between terminals (for example, between TX UE and Co-UE); or the priority of the first information is equal to the priority of the first TB to be transmitted.

In an implementation of the present disclosure, a step of sending, by the first terminal, first information to a second terminal includes: sending, by the first terminal, the first information to the second terminal by using a third resource.

In an implementation of the present disclosure, the execution module 301 is further configured to perform one of the following:

(1) triggering selection for the third resource and selection for the transmission resource separately;

(2) triggering selection for the third resource and selection for the transmission resource simultaneously; and (3) triggering selection for the transmission resource, where the third resource is at least part of the transmission resource.

In an implementation of the present disclosure, a step of triggering the selection for the third resource includes:

when a condition in which the first terminal selects or reselects a first TB to be transmitted is met, triggering, by the first terminal, the selection for the third resource. In some implementations, the first terminal autonomously decides whether to trigger the selection for the third resource.

In some implementations, the priority of the first information is further used for priority determination between sending or receiving the first information and another transmission; and the another transmission include at least one of NR SL sending, NR SL reception, NR UL sending, EUTRA SL sending, and EUTRA SL reception.

In an implementation of the present disclosure, the execution module 301 is further configured to:

transmit a first TB to be transmitted in a target resource selection mode, where the target resource selection mode is one or more of first resource selection modes; or transmit a first TB to be transmitted through a target resource, where the target resource is one or more of the transmission resources, where the first resource selection mode includes one or more of the following: a resource recommendation mode and an autonomous resource selection mode, the resource recommendation mode is used for the first terminal to obtain the first resource, and the autonomous resource selection mode is used for the first terminal to autonomously select the second resource.

In an implementation of the present disclosure, the target resource selection mode or the target resource is specified by a protocol, configured by a control node, dynamically indicated by the control node, pre-configured by the control node, or negotiated between terminals (for example, between TX UE and Co-UE).

In an implementation of the present disclosure, the target resource selection mode or the target resource is configured by the control node based on per pool; or the target resource selection mode or the target resource is dynamically indicated by the control node based on per UE.

In an implementation of the present disclosure, the execution module 301 is further configured to perform one or more of the following:

(1) determining the target resource selection mode or the target resource based on a capability or a state of the first terminal;

(2) determining the target resource selection mode or the target resource based on a CBR or a CR; and (3) determining the target resource selection mode or the target resource based on a PDB (for example, a remaining PDB) or a priority of the first TB to be transmitted.

In an implementation of the present disclosure, the execution module 301 is further configured to:

determine, based on a CBR or a CR, that the first resource is a resource expected to be used by the first terminal, or determines that the first resource is a resource not expected to be used by the first terminal.

In an implementation of the present disclosure, the target resource selection mode or the target resource is dynamically selected by the first terminal, that is, the first terminal uses the autonomous resource selection mode or uses the autonomously selected resource.

In an implementation of the present disclosure, when the selection for the transmission resource and the selection for the third resource are independently triggered, (1) the selection for the transmission resource is triggered autonomously based on the first terminal, or triggered based on a trigger condition of autonomous resource selection in a mode 2 (for example, a mode 2 in Rel-16);

or (2) a time interval between a trigger time for the selection for the transmission resource and a trigger time for the selection for the third resource (for example, a minimum trigger time or a maximum trigger time) is specified by a protocol, configured by a control node, pre-configured by the control node, negotiated between terminals, or determined by using a preset rule;

or (3) trigger of the selection for the transmission resource is related to the first information and/or the second information.

In an implementation of the present disclosure, the time interval is determined based on a PDB (for example, a remaining PDB) of a first TB to be transmitted.

In an implementation of the present disclosure, that trigger of the selection for the transmission resource is related to the first information and/or the second information includes one or more of the following items.

(1) After the selection for the third resource is triggered, if the first terminal does not send or fails to send the first information within a preset time, the first terminal triggers the selection for the transmission resource.

(2) After the selection for the third resource is triggered, if the first terminal fails to receive or fails to demodulate the second information within a preset time, the first terminal triggers the selection for the transmission resource.

(3) After the first information is sent, if the first terminal fails to receive or fails to demodulate the second information within a preset time, the first terminal triggers the selection for the transmission resource.

In some implementations, the preset time is related to the PDB of the first TB to be transmitted (such as the remaining PDB).

In some implementations, a preset time is specified in a protocol, configured, dynamically indicated, or pre-configured by the control node, or negotiated between terminals (for example, between TX UE and Co-UE).

(4) When the first information is received or successfully received, the first terminal triggers the selection for the transmission resource.

(5) When the second information is sent or successfully sent, the first terminal triggers the selection for the transmission resource.

In an implementation of the present disclosure, when the selection for the transmission resource and the selection for the third resource are triggered simultaneously (or triggered uniformly) (in this case, only the transmission resource needs to be triggered), a location of the transmission resource is determined according to a preset rule.

For example, the transmission resource of the TB is located after X time units of the resource selection trigger, or after Y time units of a selected first information bearer resource, and X or Y is greater than or equal to 0.

In an implementation of the present disclosure, a selection criterion for the target resource selection mode or the target resource includes one or more of the following:

(1) the autonomous resource selection mode is preferentially used as the target resource selection mode, or the second resource is preferentially used as the target resource;

(2) the resource recommendation mode is preferentially used as the target resource selection mode, or the first resource is preferentially used as the target resource; and (3) the target resource selection mode is one or more of the first resource selection modes autonomously selected by the first terminal, or the target resource is part or all of one or more types of the transmission resource autonomously selected by the first terminal.

In an implementation of the present disclosure, a selection criterion for the autonomous resource selection mode or the second resource includes one or more of the following:

(1) when the first terminal does not obtain the first resource within a preset time, using, by the first terminal, the autonomous resource selection mode or the second resource (that is, the first terminal uses an autonomously selected resource); and (2) when the first resource is used up, or after one or more time units after the first resource is used up, using, by the first terminal, the autonomous resource selection mode or the second resource.

In an implementation of the present disclosure, a situation in which the first terminal does not obtain the first resource within a preset time includes one or more of the following items:

(1) after the selection for the third resource is triggered, the first terminal does not send or fails to send the first information within a preset time;

(2) after the selection for the third resource is triggered, or the first information is sent, the first terminal fails to receive or fails to demodulate the second information within a preset time;

(3) after the selection for the transmission resource is triggered, the first terminal fails to receive or fails to demodulate the second information within a preset time, or the first terminal does not send or fails to send the first information; and (4) before the first terminal autonomously selects a first resource, the first terminal fails to receive or fails to demodulate the second information.

In an implementation of the present disclosure, the preset time is related to a PDB of a first TB to be transmitted (or a remaining PDB); or the preset time is specified by a protocol, configured by a control node, dynamically indicated by the control node, pre-configured by the control node, or negotiated between terminals (for example, between TX UE and Co-UE).

In an implementation of the present disclosure, the first resource selection mode includes a resource recommendation mode and an autonomous resource selection mode, and the first terminal preferentially uses a recommended resource selection mode;

or the transmission resource includes all or part of the first resource and the second resource, and the first terminal preferentially uses the first resource.

In an implementation of the present disclosure, if the first terminal selects a resource recommendation mode or an autonomous resource selection mode, the first terminal keeps using the resource recommendation mode or the autonomous resource selection mode;

and/or if the first terminal selects a resource recommendation mode or an autonomous resource selection mode, the first terminal keeps transmitting a second TB by using a resource selected in the autonomous resource selection mode or the resource recommendation mode.

In an implementation of the present disclosure, when the target resource is part or all of one or more types of the transmission resource autonomously selected by the first terminal, the target resource meets one or more of the following:

(1) a number of the target resources is less than or equal to one or more of maximum transmission times of the first TB to be transmitted, a number of the first resources, and a number of the second resources;

(2) the first terminal cannot discard a reserved resource; and (3) the target resource meets a preset restriction condition, where the preset restriction condition includes one or more of the following:

(a) for a TB to be transmitted that is fed back by an HARQ or for a pool configured with a PSFCH, a distance between any two target resources meets an HARQ RTT requirement; and (b) a time interval between any two target resources is less than a preset value.

In an implementation of the present disclosure, the preset restriction condition is not applicable to at least one of the following cases:

(1) between the first resource and the second resource;

(2) between the first resources;

(3) between a $1^{st}$ first resource indicated by the first information and a second resource before the $1^{st}$ first resource; and (4) between a last first resource indicated by the first information and a second resource after the last first resource.

In an implementation of the present disclosure, the execution module 301 is further configured to:

reselect the second resource based on the preset restriction condition. For example, the TX UE reselects an autonomously selected resource thereof to meet the preset restriction.

In an implementation of the present disclosure, the execution module 301 is further configured to:

perform re-evaluation or pre-emption detection on the first resource.

In an implementation of the present disclosure, the re-evaluation or pre-emption detection is specified by a protocol, configured by a control node, dynamically indicated by the control node, pre-configured by the control node, or negotiated between terminals (for example, between TX UE and Co-UE).

In an implementation of the present disclosure, the execution module 301 is further configured to:

after the performing, by the first terminal, re-evaluation or pre-emption detection on the first resource, perform one or more of the following:

(1) discarding an interference resource;

(2) reselecting the first resource; and (3) selecting the second resource.

The apparatus provided in this embodiment of the present disclosure can implement the processes implemented in the method embodiment shown in FIG. 1, and achieve a same technical effect. To avoid repetition, details are not provided herein again.

This embodiment of the present disclosure further provides a terminal, including a processor and a communications interface, where the processor is used for executing a first operation, and the first operation includes one or more of the following: (1) sending first information to a second terminal, where the first information is used to trigger the second terminal to recommend a first resource to the first terminal;

(2) receiving second information from the second terminal, where the second information includes information about the first resource; and (3) selecting a transmission resource, where the transmission resource includes a first resource and/or a second resource, and the second resource is a resource autonomously selected by the first terminal. The terminal embodiment is corresponding to the terminal side method embodiment, each implementation process and implementation of the method embodiment can be applied to the terminal embodiment, and a same technical effect can be achieved.

Figure 4:
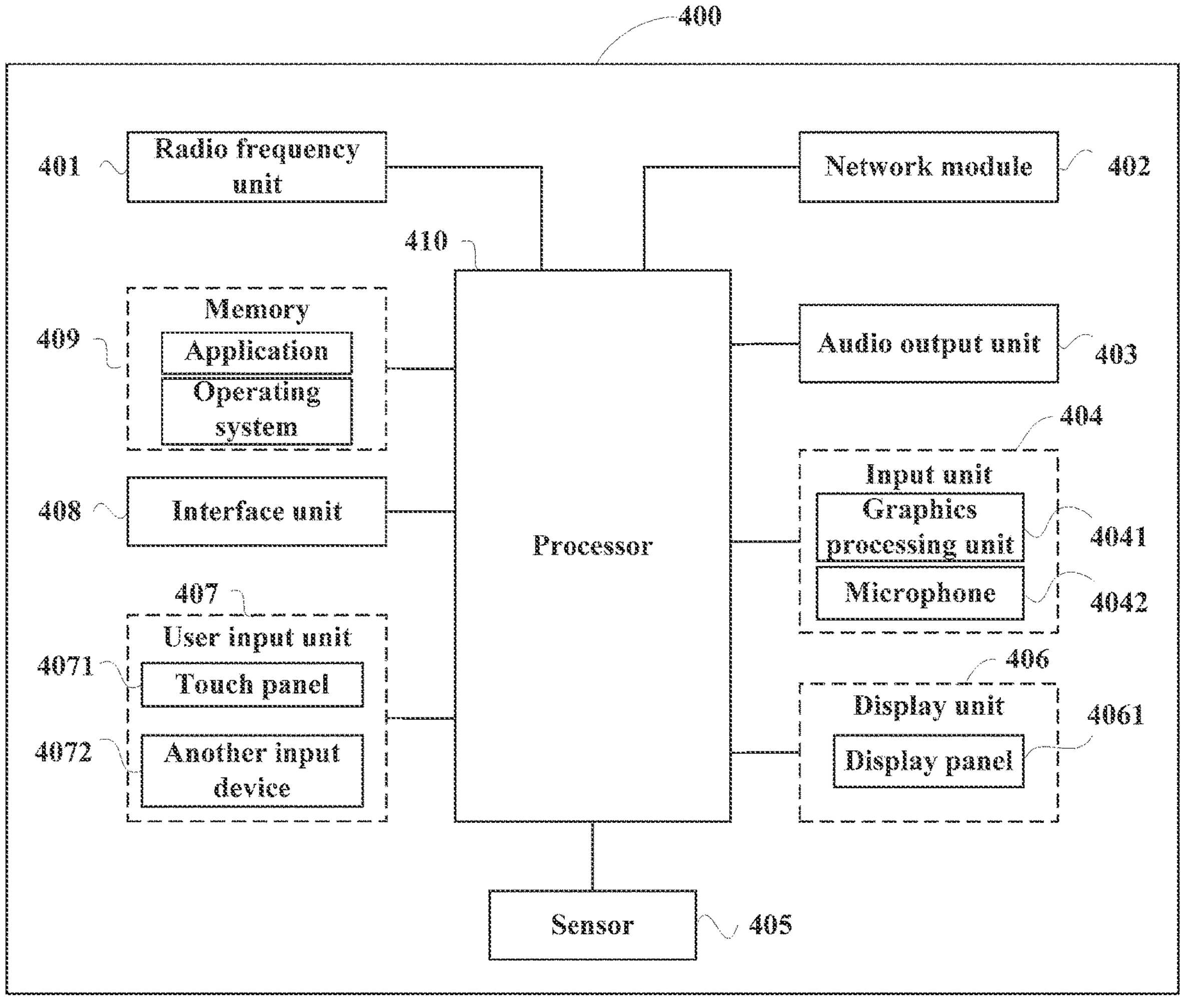
FIG. 4 is a block diagram of a terminal according to an embodiment of the present disclosure.

In some implementations, FIG. 4 is a schematic diagram of a hardware structure of a terminal for implementing embodiments of the present disclosure. The terminal 400 includes but is not limited to at least part of components such as a radio frequency unit 401, a network module 402, an audio output unit 403, an input unit 404, a sensor 405, a display unit 406, a user input unit 407, an interface unit 408, a memory 409, and a processor 410.

A person skilled in the art can understand that the terminal 400 may further include a power supply (such as a battery) that supplies power to each component. The power supply may be logically connected to the processor 410 by using a power supply management system, to implement functions such as charging and discharging management, and power consumption management by using the power supply management system. The terminal structure shown in FIG. 4 constitutes no limitation on the terminal, and the terminal may include more or fewer components than those shown in the figure, or combine some components, or have different component arrangements. Details are not described herein.

It should be understood that, in the embodiments of the present disclosure, the input unit 404 may include a Graphics Processing Unit (GPU) 4041 and a microphone 4042, and the graphics processing unit 4041 processes image data of a still picture or video obtained by an image capture apparatus (such as a camera) in a video capture mode or an image capture mode. The display unit 406 may include a display panel 4061. In some implementations, the display panel 4061 may be configured in a form such as a liquid crystal display or an organic light-emitting diode. The user input unit 407 includes a touch panel 4071 and another input device 4072. The touch panel 4071 is also referred to as a touchscreen. The touch panel 4071 may include two parts: a touch detection apparatus and a touch controller. The another input device 4072 may include but is not limited to a physical keyboard, a functional button (such as a volume control button or a power on/off button), a trackball, a mouse, and a joystick. Details are not described herein.

In this embodiment of the present disclosure, the radio frequency unit 401 receives downlink data from a network side device and then sends the downlink data to the processor 410 for processing; and sends uplink data to the network side device. Usually, the radio frequency unit 401 includes but is not limited to an antenna, at least one amplifier, a transceiver, a coupler, a low noise amplifier, a duplexer, and the like.

The memory 409 may be configured to store a software program or an instruction and various data. The memory 409 may mainly include a program or instruction storage area and a data storage area. The program or instruction storage area may store an operating system, and an application or an instruction required by at least one function (for example, a sound playing function or an image playing function). In addition, the memory 409 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 410 may include one or more processing units. In some implementations, an application processor and a modem processor may be integrated into the processor 410. The application processor mainly processes an operating system, a user interface, an application, an instruction, or the like. The modem processor mainly processes wireless communications, for example, a baseband processor. It can be understood that, in some implementations, the modem processor may not be integrated into the processor 410.

The terminal provided in this embodiment of the present disclosure can implement the processes implemented in the method embodiment shown in FIG. 2, and achieve a same technical effect. To avoid repetition, details are not provided herein again.

An embodiment of the present disclosure further provides a computer program/program product. The computer program/program product is stored in a storage medium, and the computer program/program product is executed by at least one processor to implement steps of the processing method shown in FIG. 2.

An embodiment of the present disclosure further provides a readable storage medium, where the readable storage medium stores a program or an instruction, and when the program or the instruction is executed by a processor, the processes of the foregoing method embodiments shown in FIG. 2 are implemented, and a same technical effect achieved can be achieved. To avoid repetition, details are not described herein again.

The processor is a processor in the terminal in the foregoing embodiment. The readable storage medium includes a computer-readable storage medium, such as a computer Read-Only Memory (ROM), a Random Access Memory (RAM), a magnetic disk, or an optical disc.

An embodiment of the present disclosure further provides a chip, where the chip includes a processor and a communications interface, and the communications interface is coupled to the processor. The processor is configured to run a program or an instruction to implement the processes of the method embodiment shown in FIG. 2, and a same technical effect can be achieved. To avoid repetition, details are not described herein again.

It should be understood that the chip mentioned in this embodiment of the present disclosure may also be referred to as a system-level chip, a system chip, a chip system, an on-chip system chip, or the like.

An embodiment of the present disclosure further provides a communications device, configured to perform the processes of the method embodiment shown in FIG. 2, and a same technical effect is achieved. To avoid repetition, details are not described herein again.

It should be noted that, in this specification, the term "include," "comprise," or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the implementations of the present disclosure is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. Based on such an understanding, the technical solutions of the present disclosure essentially or the part contributing to the related technologies may be implemented in a form of a computer program product. The computer program product is stored in a storage medium (for example, a ROM/RAM, a magnetic disk, or a compact disc), and includes a plurality of indications for indicating a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A SideLink (SL) resource recommendation method, comprising:

performing, by a first terminal, a first operation, wherein the first operation comprises one or more of the following:

sending first information to a second terminal, wherein the first information is used to trigger the second terminal to recommend a first resource to the first terminal; or receiving second information from the second terminal, wherein the second information comprises information about the first resource;

based on whether the first terminal supports a capability of carrier sensing, determining, by the first terminal, a target resource comprising at least one of the first resource or a second resource, wherein the second resource is a resource autonomously selected by the first terminal; and transmitting, by the first terminal, a first Transport Block (TB) to be transmitted through the target resource, wherein sending, by the first terminal, the first information to the second terminal comprises:

sending, by the first terminal, the first information to the second terminal by using a third resource, wherein the SL resource recommendation method further comprises:

triggering, by the first terminal, selection for the third resource and selection for the transmission resource independently, wherein when the selection for the transmission resource and the selection for the third resource are independently triggered, trigger of the selection for the transmission resource is related to the first information or the second information, and wherein that trigger of the selection for the transmission resource is related to the first information or the second information comprises one or more of the following:

after the selection for the third resource is triggered, when the first terminal does not send or fails to send the first information within a first preset time, triggering, by the first terminal, the selection for the transmission resource;

after the selection for the third resource is triggered, when the first terminal fails to receive or fails to demodulate the second information within a second preset time, triggering, by the first terminal, the selection for the transmission resource; or after the first information is sent, when the first terminal fails to receive or fails to demodulate the second information within the second preset time, triggering, by the first terminal, the selection for the transmission resource.

2. The SL resource recommendation method according to claim 1, wherein the first information is information carried on a first channel, and the first channel comprises a Physical Sidelink Control CHannel (PSCCH) or a Physical Sidelink Shared CHannel (PSSCH).

3. The SL resource recommendation method according to claim 2, wherein a priority of the first channel is a highest value among priorities of all pieces of information carried on the first channel;

the priority of the first channel is the priority of the first information; or the priority of the first channel is determined based on a priority of third information, wherein the third information comprises other information carried on the first channel other than the first information.

4. The SL resource recommendation method according to claim 1, wherein a Packet Delay Budget (PDB), a number of sub-channels, or a number of retransmissions of the first information is specified by a protocol, configured or pre-configured by a control node, dynamically indicated by the control node, negotiated between terminals, or determined by the first terminal autonomously.

5. The SL resource recommendation method according to claim 1, wherein a Packet Delay Budget (PDB) of the first information is related to a PDB of the first TB to be transmitted.

6. The SL resource recommendation method according to claim 1, wherein a priority of the first information is specified by a protocol, configured or pre-configured by a control node, dynamically indicated by the control node, or negotiated between terminals; or the priority of the first information is equal to a priority of the first TB to be transmitted.

7. The SL resource recommendation method according to claim 6, wherein the priority of the first information is further used for priority determination between sending or receiving the first information and another transmission; and the another transmission comprise at least one of New Radio (NR) SL sending, NR SL reception, NR UpLink (UL) sending, Evolved Universal Terrestrial Radio Access (EUTRA) SL sending, or EUTRA SL reception.

8. The SL resource recommendation method according to claim 1, wherein the first information is information carried on a second channel, and the second channel comprises a Physical Sidelink Feedback CHannel (PSFCH) or a channel other than a Physical Sidelink Control CHannel (PSCCH), a Physical Sidelink Shared CHannel (PSSCH), or the PSFCH; and wherein:

a priority of the first information is specified by a protocol, configured or pre-configured by a control node, dynamically indicated by the control node, or negotiated between terminals; or the priority of the first information is equal to a priority of the first TB to be transmitted.

9. The SL resource recommendation method according to claim 1, wherein the SL resource recommendation method further comprises:

triggering, by the first terminal, selection for the third resource and selection for the transmission resource simultaneously; or triggering, by the first terminal, selection for the transmission resource, wherein the third resource is at least part of the transmission resource, wherein triggering, by the first terminal, selection for the third resource further comprises:

when the first terminal selects or reselects the first TB to be transmitted, triggering, by the first terminal, the selection for the third resource.

10. The SL resource recommendation method according to claim 9, wherein when the selection for the transmission resource and the selection for the third resource are independently triggered, the selection for the transmission resource is triggered autonomously based on the first terminal, or triggered based on a trigger condition of autonomous resource selection in a mode 2; or a time interval between a trigger time for the selection for the transmission resource and a trigger time for the selection for the third resource is specified by a protocol, configured or pre-configured by a control node, negotiated between terminals, or determined by using a preset rule, wherein the time interval is determined based on a Packet Delay Budget (PDB) of the first TB to be transmitted, wherein that trigger of the selection for the transmission resource is related to the first information or the second information further comprises one or more of the following:

when the second information is received or successfully received, triggering, by the first terminal, the selection for the transmission resource; or when the first information is sent or successfully sent, triggering, by the first terminal, the selection for the transmission resource.

11. The SL resource recommendation method according to claim 9, wherein when the selection for the transmission resource and the selection for the third resource are triggered simultaneously, a location of the transmission resource is determined according to a preset rule.

12. The SL resource recommendation method according to claim 1, further comprising:

transmitting, by the first terminal, the first TB to be transmitted in a target resource selection mode, wherein the target resource selection mode is one or more of first resource selection modes, wherein the one or more of the first resource selection modes comprise one or more of the following:

a resource recommendation mode and an autonomous resource selection mode, the resource recommendation mode is used for the first terminal to obtain the first resource, or the autonomous resource selection mode is used for the first terminal to autonomously select the second resource.

13. The SL resource recommendation method according to claim 12, wherein:

the target resource selection mode or the target resource is specified by a protocol, configured or pre-configured by a control node, dynamically indicated by the control node, or negotiated between terminals, wherein:

the target resource selection mode or the target resource is configured by the control node based on per pool; or the target resource selection mode or the target resource is dynamically indicated by the control node based on per terminal, and wherein the target resource selection mode or the target resource is dynamically selected by the first terminal.

14. The SL resource recommendation method according to claim 12, further comprising one or more of the following:

determining, by the first terminal, the target resource selection mode or the target resource based on a state of the first terminal;

determining, by the first terminal, the target resource selection mode or the target resource based on a Channel Busy Rate (CBR) or a Channel occupation Rate (CR); or determining, by the first terminal, the target resource selection mode or the target resource based on a Packet Delay Budget (PDB) or a priority of the first TB to be transmitted.

15. The SL resource recommendation method according to claim 12, wherein a selection criterion for the target resource selection mode or the target resource comprises one or more of the following:

the autonomous resource selection mode is preferentially used as the target resource selection mode, or the second resource is preferentially used as the target resource;

the resource recommendation mode is preferentially used as the target resource selection mode, or the first resource is preferentially used as the target resource; or the target resource selection mode is one or more of the first resource selection modes autonomously selected by the first terminal, or the target resource is part or all of one or more types of a transmission resource autonomously selected by the first terminal.

16. The SL resource recommendation method according to claim 12, wherein:

the one or more of the first resource selection modes comprise a resource recommendation mode and an autonomous resource selection mode, and the first terminal preferentially uses the resource recommendation mode; or a transmission resource comprises all or part of the first resource and the second resource, and the first terminal preferentially uses the first resource, and wherein:

when the first terminal selects the resource recommendation mode or the autonomous resource selection mode, the first terminal keeps using the resource recommendation mode or the autonomous resource selection mode; or when the first terminal selects the resource recommendation mode or the autonomous resource selection mode, the first terminal keeps transmitting a second TB by using a resource selected in the autonomous resource selection mode or the resource recommendation mode.

17. The SL resource recommendation method according to claim 1, further comprising:

determining, by the first terminal based on a Channel Busy Rate (CBR) or a Channel occupation Rate (CR), that the first resource is a resource expected to be used by the first terminal, or determines that the first resource is a resource not expected to be used by the first terminal.

18. The SL resource recommendation method according to claim 1, wherein the SL resource recommendation method further comprises:

performing, by the first terminal, re-evaluation or pre-emption detection on the first resource, wherein the re-evaluation or pre-emption detection is specified by a protocol, configured or pre-configured by a control node, dynamically indicated by the control node, or negotiated between terminals; and after the performing, by the first terminal, re-evaluation or pre-emption detection on the first resource, performing, by the first terminal, one or more of the following:

discarding an interference resource;

reselecting the first resource; or selecting the second resource.

19. A first terminal, comprising:

a memory storing computer-readable instructions; and a processor coupled to the memory and configured to execute the computer-readable instructions, wherein the computer-readable instructions, when executed by the processor, cause the processor to perform operations comprising:

performing a first operation, wherein the first operation comprises one or more of the following:

sending first information to a second terminal, wherein the first information is used to trigger the second terminal to recommend a first resource to the first terminal; or receiving second information from the second terminal, wherein the second information comprises information about the first resource;

based on whether the first terminal supports a capability of carrier sensing, determining, by the first terminal, a target resource comprising at least one of the first resource or a second resource, wherein the second resource is a resource autonomously selected by the first terminal; and transmitting, by the first terminal, a first Transport Block (TB) to be transmitted through the target resource, wherein sending, by the first terminal, the first information to the second terminal comprises:

sending, by the first terminal, the first information to the second terminal by using a third resource, wherein the SL resource recommendation method further comprises:

triggering, by the first terminal, selection for the third resource and selection for the transmission resource independently, wherein when the selection for the transmission resource and the selection for the third resource are independently triggered, trigger of the selection for the transmission resource is related to the first information or the second information, and wherein that trigger of the selection for the transmission resource is related to the first information or the second information comprises one or more of the following:

after the selection for the third resource is triggered, when the first terminal does not send or fails to send the first information within a first preset time, triggering, by the first terminal, the selection for the transmission resource;

after the selection for the third resource is triggered, when the first terminal fails to receive or fails to demodulate the second information within a second preset time, triggering, by the first terminal, the selection for the transmission resource; or after the first information is sent, when the first terminal fails to receive or fails to demodulate the second information within the second preset time, triggering, by the first terminal, the selection for the transmission resource.

20. A non-transitory computer-readable medium storing instructions that, when executed by a processor, cause the processor to perform operations comprising:

performing, by a first terminal, a first operation, wherein the first operation comprises one or more of the following:

sending first information to a second terminal, wherein the first information is used to trigger the second terminal to recommend a first resource to the first terminal; or receiving second information from the second terminal, wherein the second information comprises information about the first resource;

based on whether the first terminal supports a capability of carrier sensing, determining, by the first terminal, a target resource comprising at least one of the first resource or a second resource, wherein the second resource is a resource autonomously selected by the first terminal; and transmitting, by the first terminal, a first Transport Block (TB) to be transmitted through the target resource, wherein sending, by the first terminal, the first information to the second terminal comprises:

sending, by the first terminal, the first information to the second terminal by using a third resource, wherein the SL resource recommendation method further comprises:

triggering, by the first terminal, selection for the third resource and selection for the transmission resource independently, wherein when the selection for the transmission resource and the selection for the third resource are independently triggered, trigger of the selection for the transmission resource is related to the first information or the second information, and wherein that trigger of the selection for the transmission resource is related to the first information or the second information comprises one or more of the following:

after the selection for the third resource is triggered, when the first terminal does not send or fails to send the first information within a first preset time, triggering, by the first terminal, the selection for the transmission resource;

after the selection for the third resource is triggered, when the first terminal fails to receive or fails to demodulate the second information within a second preset time, triggering, by the first terminal, the selection for the transmission resource; or after the first information is sent, when the first terminal fails to receive or fails to demodulate the second information within the second preset time, triggering, by the first terminal, the selection for the transmission resource.

* * * * *